United States Patent [19]

Hasegawa et al.

[11] Patent Number: 5,541,266

[45] Date of Patent: Jul. 30, 1996

[54] CURABLE COMPOSITION

[75] Inventors: Keiko Hasegawa; Jo Kawamura; Fumio Kawakubo, all of Hyogo, Japan

[73] Assignee: Kanegafuchi Kagaku Kogyo Kabushiki Kaisha, Osaka, Japan

[21] Appl. No.: 384,813

[22] Filed: Feb. 6, 1995

Related U.S. Application Data

[63] Continuation of Ser. No. 226,088, Apr. 11, 1994, abandoned.

[30] Foreign Application Priority Data

Apr. 12, 1993 [JP] Japan ..................... 5-107236

[51] Int. Cl.$^6$ ..................................... C08G 65/32
[52] U.S. Cl. ..................... 525/403; 525/407; 525/409; 528/34; 156/327
[58] Field of Search ..................... 525/409, 403, 525/407; 528/34; 156/327

[56] References Cited

U.S. PATENT DOCUMENTS

| | | | |
|---|---|---|---|
| 4,983,700 | 1/1991 | Yukimoto et al. | 528/34 |
| 5,013,807 | 5/1974 | Shimizu et al. | 528/17 |

FOREIGN PATENT DOCUMENTS

| | | |
|---|---|---|
| 0109979A1 | 6/1984 | European Pat. Off. . |
| 0345805A2 | 12/1989 | European Pat. Off. . |
| 0476150A1 | 3/1992 | European Pat. Off. . |
| 59-24771 | 2/1984 | Japan . |
| 62-35421 | 8/1987 | Japan . |

Primary Examiner—Ralph H. Dean
Attorney, Agent, or Firm—Armstrong, Westerman, Hattori, McLeland & Naughton

[57] ABSTRACT

A curable composition containing (a) 100 parts by weight of an oxyalkylene polymer having a silicon atom-containing group to which a hydroxyl group or a hydrolyzable group is bonded and capable of crosslinking on formation of a siloxane bond and (b) from 0.01 to 20 parts by weight of a hydrolyzable silicon compound represented by formula (1):

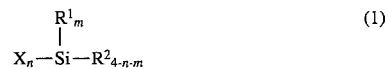

wherein X represents a hydrolyzable group; $R^1$ represents a monovalent hydrocarbon group; $R^2$ represents a monovalent organic group containing an amino group or an imino group and having a carbon atom number to nitrogen atom number ratio (C/N ratio) of more than 3; m represents 0, 1 or 2; n represents 1, 2 or 3; and (m+n) is less than 4.

8 Claims, No Drawings

CURABLE COMPOSITION

This application is a continuation of application Ser. No. 08/226,088 filed Apr. 11, 1994, now abandoned.

FIELD OF THE INVENTION

The present invention relates to a curable rubber composition having improved water-resistant adhesion to a porous substrate.

PRIOR ART

In the field of curable compositions, particularly sealants, it has been necessary to apply a primer for assuring sufficient adhesion between a substrate and a sealant. As is well known, the primer to be applied must be selected properly so as to be matched with various sealants and various substrates. Besides, application of a primer is complicated troublesome operation. Sealants firmly adhering to a substrate without primer have thus been demanded. Various studies have hitherto been given to techniques for imparting adhesiveness to a sealant itself. For example, addition of an amino-containing hydrolyzable silicon compound or a reaction product of the silicon compound and an epoxy compound has been proposed as disclosed in JP-A-59-24771 and JP-B-62-35421. ("JP-A" and "JP-B" used herein mean Japanese Patent Publication without examination, and after examination, respectively.) However, these techniques, when applied to porous substrates, such as mortar, concrete, lightweight expanded concrete, and stone, still involve the problem that water is apt to penetrate into the substrate through the pores especially when the substrate is soaked in water and the sealant easily separates from the interface.

SUMMARY OF THE INVENTION

An object of the present invention is to provide a curable composition which firmly adheres to a substrate without primer and is prevented from greatly reducing the adhesion even when soaked in water.

The present inventors have found that an oxyalkylene polymer having a silicon atom-containing group to which a hydroxyl group or a hydrolyzable group is bonded (hereinafter referred to as a reactive silicon group) and capable of crosslinking on formation of a siloxane bond, wherein the oxyalkylene polymer has added thereto a specific hydrolyzable silicon compound as an active component, exhibits strong adhesion in a dry state to a porous substrate, such as mortar and stone, as well as metals, glass and coated surfaces and markedly improved water-resistant adhesion over conventional curable compositions, and thus reached the present invention.

The present invention relates to a curable composition containing (a) 100 parts by weight of an oxyalkylene polymer having a silicon atom-containing group to which a hydroxyl group or a hydrolyzable group is bonded and capable of crosslinking on formation of a siloxane bond and (b) from 0.01 to 20 parts by weight of a hydrolyzable silicon compound represented by formula:

(1)

wherein X represents a hydrolyzable group; $R^1$ represents a monovalent hydrocarbon group; $R^2$ represents a monovalent organic group containing an amino group or an imino group and having a ratio of carbon atom number to nitrogen atom number (C/N ratio) of more than 3; m represents 0, 1 or 2; n represents 1, 2 or 3; and (m+n) is less than 4.

DETAILED DESCRIPTION OF THE INVENTION

The oxyalkylene polymer which can be used in the present invention preferably has a number average molecular weight of from 500 to 50,000 and particularly 3,000 to 30,000. The structural units constituting the main chain of the polymer include —$CH_2O$—, —$CH_2CH_2O$—, —$CH(CH_3)CH_2O$—, —$CH(C_2H_5)CH_2O$—, and —$CH_2CH_2CH_2CH_2O$—. While the molecular chain of the oxyalkylene polymer may be composed of one or more of these structural units, the main chain preferably comprises an oxypropylene polymer.

In consideration of the properties of the oxyalkylene polymer, if the number average molecular weight is over 50,000, the polymer becomes highly viscous resulting in deteriorating workability, whereas, if the molecular weight thereof is lower than 500, a property of the sealant in terms of strength, elongation, etc., according to the present invention cannot be attained.

Specific examples of the polymer are mentioned in JP-A-50-156599, JP-A-51-73561, JP-A-54-6096, JP-A-55-123620, JP-A-55-125121, JP-A-55-131022, JP-A-55-A-55-137129. Oxyalkylene polymers having a number average molecular weight of 6,000 or more and an Mw/Mn ratio of not more than 1.6, that is, a high molecular weight and a narrow molecular weight distribution, which are disclosed in JP-A-61-197631, JP-A-61-215622, JP-A-61-215623, and JP-A-61-218632, can also be used.

The reactive silicon group as noted in the present invention denotes a group crosslinkable through silanol condensation reaction in which a hydroxyl group or a hydrolyzable group is bonded to a silicon atom as a functional group. The reactive silicon group is present in the oxyalkylene polymer. While not limiting, the number of the reactive silicon groups per molecule of the polymer is preferably from 1.1 to 10, and more preferably from 1.2 to 5. Especially preferred reactive silicon groups are those represented by formula:

wherein $R^1$ represents a monovalent hydrocarbon group; Y represents a hydroxyl group or a hydrolyzable group; and a represents 0, 1 or 2.

The hydrolyzable group bonded to the silicon atom includes an alkoxy group, an acyloxy group, a ketoximate group, an amino group, an amide group, an acid amide group, an aminooxy group, a mercapto group, and an alkenyloxy group. Among them, an alkoxy group, an acyloxy group, a ketoximate group, an amino group, an amide group, an amino-oxy group, a mercapto group, and an alkenyloxy group are preferred. In particular, an alkoxy group, e.g., a methoxy group, is preferred because of its mild hydrolyzability and ease in handling.

In the present invention, the hydrolyzable silicon compound represented by formula (1) effectively acts on water-resistant adhesion between the curable composition and a porous substrate. Examples of X include an alkoxy group, an acyloxy group, a ketoximate group, an amino group, an amino-oxy group, an amide group, and an alkenyloxy group, with an alkoxy group being preferred. n is an integer selected from 1, 2, and 3, and preferably 2 or 3. The molecular weight of the hydrolyzable silicon compound is preferably 1000 or less.

In formula (1), $R^1$ is a monovalent hydrocarbon group; m is 0, 1 or 2, and preferably 0 or 1. Such a hydrocarbon group preferably includes a lower alkyl group. $R^2$ is a monovalent organic group containing an amino group or an imino group and having a carbon atom number to nitrogen atom number ratio, i.e., a C/N ratio of more than 3. The C/N ratio is preferably 4 or more. (m+n) is less than 4, and preferably (m+n) is 3.

Technical approach to provide adhesiveness with the sealant is discussed in the descriptions of JP-B-62-35421. The C/N ratio of the hydrolyzable silicon compound according to the present invention is adapted to provide high hydrophobicity thereby satisfying the requirements for waterproof adhesion of the final products.

Group of $-R^2$ includes $-R^3N(R^4)-R^5-N(R^6)-R^7$, wherein $R^3$ and $R^5$ each represents a divalent hydrocarbon group containing 2 or more carbon atoms, and at least one of $R^3$ and $R^5$ contains 4 or more carbon atoms; $R^4$, $R^6$, and $R^7$ each represents a hydrogen atom or a monovalent hydrocarbon group, preferably an alkyl group containing 1 to 3 carbon atoms.

The specific but non-limiting examples of the above-mentioned hydrolyzable silicon compound are shown below.

$H_2N(CH_2)_6NH(CH_2)_3Si(OCH_3)_3$, $H_2N(CH_2)_8NH(CH_2)_3Si(OCH_3)_3$, $H_2N(CH_2)_6NH(CH_2)_3Si(CH_3)(OCH_3)_2$, $H_2N(CH_2)_6NH(CH_2)_3Si(OCH_2CH_3)_3$, $H_2N(CH_2)_2NHCH_2\text{-ph-}(CH_2)_2Si(OCH_3)_3$, and $H_2N(CH_2)_4NHCH_2\text{-ph-}(CH_2)_2Si(OCH_3)_3$ wherein ph represents a p-phenylene group.

The above-mentioned hydrolyzable silicon compound is used in an amount of from 0.01 to 20 parts by weight, and preferably from 0.1 to 10 parts by weight, per 100 parts by weight of the oxyalkylene polymer having a reactive silicon group and capable of crosslinking on siloxane bond formation. If the amount is less than 0.01 part by weight, the expected adhesion is hardly obtained. If it exceeds 20 parts by weight, the rubber physical properties after curing are adversely affected.

For the purpose of adjustment of physical properties and enhancement of adhesion, the composition of the present invention may contain various hydrolyzable silicon compounds. Illustrative examples of such hydrolyzable silicon compounds include amino-substituted alkoxysilane compounds, such as $H_2N(CH_2)_3Si(OCH_3)_3$, $H_2N(CH_2)_2NH(CH_2)_3Si(OCH_3)_3$, $H_2N(CH_2)_2NH(CH_2)_3Si(CH_3)(OCH_3)_2$, $(C_2H_5O)_3Si(CH_2)_3NH(CH_2)_2NH(CH_2)_3Si(OCH_3)_3$, and $H_2N(CH_2)_2NH(CH_2)_3Si(OC_2H_5)_3$;

silane compounds, such as $CH_2(O)CHCH_2O(CH_2)_3Si(OCH_3)_3$,

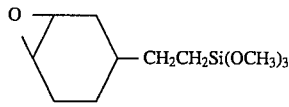

$CH_2=C(CH_3)COO(C_3H_6)Si(OCH_3)_3$, $CH_2=CHSi(OCH_3)_3$, and $HSC_3H_6Si(OCH_3)_3$;

reaction products between the above-mentioned amino-substituted alkoxysilane compound (which may be, if desired, an amino-substituted alkoxysilane selected from the hydrolyzable silicon compounds according to the present invention) and the above-mentioned epoxysilane compound, e.g., $CH_2(O)CHCH_2O(CH_2)_3Si(OCH_3)_3$ or

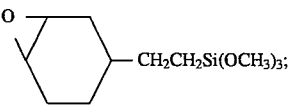

and reaction products between the above-mentioned amino-substituted alkoxysilane and a methacryloylsilane compound, e.g., $CH_2=C(CH_3)COO(CH_2)_3Si(OCH_3)_3$ or $CH_2=C(CH_3)COO(CH_2)_3Si(OCH_2CH_2OCH_3)_3$.

The reaction between the amino-substituted alkoxysilane and the epoxysilane compound or methacryloylsilane compound can easily be carried out by mixing 1 mol of the amino-substituted alkoxysilane and from 0.2 to 5 mol of the latter silane compound and stirring the mixture at room temperature to 180° C. for 1 to 8 hours.

The amino-substituted alkoxysilane or a derivative thereof is preferably used in an amount of not more than 20 parts by weight per 100 parts by weight of the oxyalkylene polymer having a reactive silicon group. If the amount exceeds 20 parts by weight, the rubber physical properties after curing are adversely affected.

In carrying out curing of the polymer of the present invention, a catalyst for silanol condensation (curing catalyst) is used. The silanol condensation catalyst to be used is widely selected from conventionally known ones. Examples of usable catalysts include titanic acid esters, such as tetrabutyl titanate and tetrapropyl titanate; tin carboxylates, such as dibutyltin dilaurate, dibutyltin maleate, dibutyltin diacetate, tin octylate, and tin naphthenate; a reaction product between dibutyltin oxide and a phthalic ester; dibutyltin diacetylacetonate; amine compounds, such as butylamine, octylamine, dibutylamine, monoethanolamine, diethanolamine, and triethanolamine; and salts of these amine compounds, such as those with carboxylic acids; low-molecular polyamide resins obtained from an excess polyamine and a polybasic acid; a reaction product between an excess polyamine and an epoxy compound; and silane coupling agents having an amino group, such as γ-aminopropyltrimethoxysilane, and N-(β-aminoethyl)aminopropylmethyldimethoxysilane. Other acidic catalysts and basic catalysts known as a silanol condensation catalyst may also be used. These catalysts may be used either individually or in combination of two or more thereof.

The silanol condensation catalyst is preferably used in an amount of from about 0.01 to 20 parts by weight, and more preferably from about 0.1 to 10 parts by weight, per 100 parts by weight of the oxyalkylene polymer having a reactive silicon group. If the amount of the silanol condensation catalyst is too small with respect to the oxyalkylene polymer, the rate of curing becomes low, and the curing reaction hardly proceeds sufficiently. On the other hand, it the amount of the silanol condensation catalyst is too large with respect to the oxyalkylene polymer, curing tends to be accompanied with local heat generation or foaming, failing to provide a satisfactory cured product.

If desired, the composition of the present invention may further contain various fillers, plasticizers, and compounding additives.

Suitable fillers include reinforcing fillers, such as fumed silica, precipitated silica, anhydrous silicic acid, and carbon black; fillers, such as calcium carbonate, magnesium carbonate, diatomaceous earth, calcined clay, clay, kaolin, talc, titanium oxide, bentonite, organic bentonite, ferric oxide, zinc oxide, active zinc oxide, hydrogenated castor oil, shillas balloons, and glass balloons; and fibrous fillers, such as asbestos, glass fibers and filaments. These fillers are used in an amount of from 3 to 300 parts by weight per 100 parts by weight of the oxyalkylene polymer having a reactive silicon group.

Suitable plasticizers include phthalic esters, such as dioctyl phthalate, dibutyl phthalate, and butyl benzyl phthalate; epoxy plasticizers, such as epoxidized soybean oil, epoxidized linseed oil, and benzyl epoxystearate; polyester plasticizers, such as polyesters prepared from a dibasic acid and a dihydric alcohol; polyethers, such as polypropylene glycol and derivatives thereof; styrene polymers, such as poly-α-methylstyrene and polystyrene; polybutadiene, butadiene-acrylonitrile copolymers, polychloroprene, polyisoprene, polybutene, and chlorinated paraffins. These plasticizers are used either individually or in combination of two or more thereof. The plasticizer is preferably used in an amount of from 0 to 10 parts by weight per 100 parts by weight of the oxyalkylene polymer.

Other additives which can be used if desired include desiccants, storage stability improving agents, ultraviolet absorbents, metal deactivators, antiozonants, photo stabilizers, amine type radical chain terminators, phosphorous peroxide decomposers, anti-sag agents, colorants, and antioxidants.

The thus prepared composition is applicable as not only a two-liquid type curable composition but a one-liquid type curable composition. In the latter case, the composition is prepared in a substantially water-free condition and is preserved in a sealed state for long-term storage. This composition rapidly starts curing from its surface upon exposure to open air.

The present invention provides a curable composition having excellent water-resistance adhesion to a porous substrate, such as mortar and stone, as well as metals, glass and coated surfaces. Accordingly, the composition of the present invention is of high utility in bonding materials of the same or different kinds, such as metals, glass and coating surfaces and especially mortar, concrete, lightweight expanded concrete, and stone.

The composition of the present invention is useful as an elastic sealing compound in the field of construction and engineering works. It is also useful as a paint, an adhesive, an impregnating agent, and a coating material.

The present invention will now be illustrated in greater detail with reference to Examples, which are not to be construed as limiting the scope thereof. Unless otherwise indicated, all parts, percents and ratios are by weight.

Reference Example 1

To 100 parts of an oxypropylene polymer having a number average molecular weight of 8000 and having a methyldimethoxysilyl group at 80% of the total terminals thereof were added 120 parts of surface-treated colloidal calcium carbonate (average particle size: 0.08 μm), 55 parts of dioctyl phthalate, 20 parts of titanium oxide, 2 parts of hydrogenated castor oil, 3 parts of tin octylate, and 1.5 parts of laurylamine, and the mixture was sufficiently kneaded and passed three times through small-sized three-roll paint mill to obtain a composition.

EXAMPLES 1 TO 4

To the composition of Reference Example 1 was/were further added 3 parts of $H_2N(CH_2)_6NH(CH_2)_3Si(OCH_3)_3$ ("KBM-6063", a product of Shin-Etsu Chemical Industry Co., Ltd.) (Example 1), 3 parts of $H_2N(CH_2)_2NHCH_2$-ph-$(CH_2)_2Si(OCH_3)_3$ (wherein ph is a p-phenylene group; "X-12-5202" a product of Shin-Etsu Chemical Industry Co., Ltd.) (Example 2), 3 parts of KBM-6063 and 3 parts of $H_2N(CH_2)_2NH(CH_2)_3Si(OCH_3)_3$ ("A-1120" a product of Nippon Unicar Co., Ltd.) (Example 3), or 3 parts of X-12-5202 and 3 parts of A-1120 (Example 4), and the mixture was sufficiently kneaded to prepare a curable composition. The resulting composition was applied to mortar substrates having no primer to prepare an H-shaped specimen according to JIS A5758. After aging at room temperature for 3 days and then at 50° C. for 4 days, the specimen was dipped in water at 20° C. for 7 days and then subjected to a tensile test at a pulling speed of 50 mm/min, according to a method of adhesion strength under tension, JIS A5758, 4.14.

Comparative Examples 1 and 2

The same procedure as in Examples 1 to 4 was repeated, except for adding only A-1120 to the composition of Reference Example 1 in an amount of 3 parts (Comparative Example 1) or 6 parts (Comparative Example 2).

The results obtained are shown in Table 1 below.

TABLE 1

|  | Example No. | | | | Comparative Example No. | |
| --- | --- | --- | --- | --- | --- | --- |
|  | 1 | 2 | 3 | 4 | 1 | 2 |
| KBM-6063 | 3 | — | 3 | — | — | — |
| X-12-5202 | — | 3 | — | 3 | — | — |
| A-1120 | — | — | 3 | 3 | 3 | 6 |
| M100 (kgf/cm²) | 2.0 | 2.6 | 2.0 | 3.4 | 2.0 | 2.2 |
| TB (kgf/cm²) | 3.7 | 4.1 | 4.8 | 4.1 | 2.6 | 2.4 |
| EB (%) | 360 | 300 | 530 | 310 | 190 | 130 |
| Failure | CF | CF | CF | CF | AF | AF |

Note:
M100: Modulus at 100% elongation
TB: Tensile strength at break
EB: Elongation at break
CF: Cohesive failure (Break in cured products)
AF: Adhesive failure (Break between cured product and substrate)

It can be seen that the composition according to the present invention exhibits satisfactory water-resistant adhesion.

While the invention has been described in detail and with reference to specific embodiments thereof, it will be apparent to one skilled in the art that various changes and modifications can be made therein without departing from the spirits and scope thereof.

What is claimed is:

1. A curable composition which comprises (a) 100 parts by weight of an oxyalkylene polymer having at least one silicon atom-containing group to which a hydroxyl group or a hydrolyzable group is bonded and capable of crosslinking on formation of a siloxane bond and (b) from 0.01 to 20 parts by weight of a hydrolyzable silicon compound represented by the formula:

wherein X represents a hydrolyzable group; $R^1$ represents a monovalent hydrocarbon group; $R^2$ represents a monovalent organic group containing an —$NH_2$, optionally an imino group, and having a carbon atom number to nitrogen atom number ratio (C/N ratio) of more than 3; m represents 0, 1 or 2; n represents 1, 2 or 3; and (m+n) is less than 4.

2. The composition as claimed in claim 1, wherein said silicon atom-containing group (a) to which a hydroxyl group or a hydrolyzable group is bonded is an alkoxysilyl group.

3. The composition as claimed in claim 1, wherein the main chain of (a) is an oxypropylene polymer.

4. The composition as claimed in claim 1, wherein the amount of the hydrolyzable silicon compound from 0.1 to 10 parts by weight with respect to 100 parts by weight of the oxyalkylene polymer.

5. The composition as claimed in claim 1, wherein (m+n) is equal to 3 in formula (I).

6. The curable composition of claim 1 wherein $R^2$ is a monovalent organic group containing a terminal —$NH_2$ and an imino group and having a carbon atom number to nitrogen atom number ratio (C/N ratio) of more than 3.

7. A method for bonding substrates comprising applying to one or both of said substrates, which may be the same or different and selected from the group consisting of: mortar, concrete, lightweight expanded concrete and stone, a curable composition which comprises (a) 100 parts by weight of a oxyalkylene polymer having at least one silicon atom-containing group to which a hydroxyl group or a hydrolyzable group is bonded and capable of crosslinking on formation of a siloxane bond and (b) from 0.01 to 20 parts by weight of a hydrolyzable silicon compound represented by the formula:

$$X_n-Si-R^2_{4-n-m} \quad \overset{R^1_m}{|} \quad (1)$$

wherein X represents a hydrolyzable group; $R^1$ represents a monovalent hydrocarbon group; $R^2$ represents a monovalent organic group containing an —$NH_2$, optionally an imino group, and having a carbon atom number to nitrogen atom number ratio (C/N ratio) of more than 3; m represents 0, 1 or 2; n represents 1, 2 or 3; and (m+n) is less than 4, then bringing said substrates together to allow bonding, and curing on exposure to air.

8. The method of claim 7 wherein $R^2$ is a monovalent organic group containing a terminal —$NH_2$ and an imino group and having a carbon atom number to nitrogen atom number ratio (C/N ratio) of more than 3.

* * * * *